US008880774B2

(12) United States Patent
Schmidt et al.

(10) Patent No.: US 8,880,774 B2
(45) Date of Patent: Nov. 4, 2014

(54) HIGH AVAILABILITY VIRTUAL MACHINE CLUSTER

(71) Applicant: VMware, Inc., Palo Alto, CA (US)

(72) Inventors: Rene W. Schmidt, Aarhus (DK); Sridhar Rajagopal, Mountain View, CA (US)

(73) Assignee: VMWare, Inc., Palo Alto, CA (US)

( * ) Notice: Subject to any disclaimer, the term of this patent is extended or adjusted under 35 U.S.C. 154(b) by 0 days.

(21) Appl. No.: 14/047,963

(22) Filed: Oct. 7, 2013

(65) Prior Publication Data

US 2014/0040896 A1    Feb. 6, 2014

Related U.S. Application Data

(63) Continuation of application No. 12/017,255, filed on Jan. 21, 2008, now Pat. No. 8,554,981.

(60) Provisional application No. 60/887,958, filed on Feb. 2, 2007.

(51) Int. Cl.
*G06F 12/00*   (2006.01)
*G06F 9/455*   (2006.01)
*G06F 11/20*   (2006.01)

(52) U.S. Cl.
CPC .............. *G06F 9/455* (2013.01); *G06F 11/203* (2013.01); *G06F 11/2035* (2013.01); *G06F 11/2046* (2013.01); *G06F 11/2033* (2013.01)
USPC ...................................... 711/6; 711/E12.016

(58) Field of Classification Search
CPC ....................................................... G06F 12/08
USPC ............................................................ 711/6
See application file for complete search history.

(56) References Cited

U.S. PATENT DOCUMENTS

| | | |
|---|---|---|
| 6,243,825 B1 | 6/2001 | Gamache et al. |
| 6,757,778 B1 | 6/2004 | van Rietschote |
| 6,795,966 B1 | 9/2004 | Lim et al. |
| 6,802,062 B1 * | 10/2004 | Oyamada et al. .................. 718/1 |
| 7,093,086 B1 * | 8/2006 | van Rietschote ............. 711/161 |
| 7,203,944 B1 | 4/2007 | van Rietschote et al. |
| 7,213,246 B1 | 5/2007 | van Rietschote et al. |
| 7,480,773 B1 | 1/2009 | Reed |
| 7,484,208 B1 | 1/2009 | Nelson |

(Continued)

OTHER PUBLICATIONS

"Veritas Cluster Server for VMware ESX Server"; Veritas Datasheet, 2004 Veritas Software Corporation; 1 pg.

(Continued)

*Primary Examiner* — Aracelis Ruiz

(57) ABSTRACT

One embodiment of the present invention is a system including: (a) plural virtualization systems configured in a cluster; (b) storage accessible to each virtualization system of the cluster, wherein for each virtual machine operative in a virtualization system of the cluster, the storage maintains a representation of virtual machine state that includes at least a description of a hardware system virtualized and an image of virtualized memory state for the virtual machine; and (c) a failover system that, responsive to an interruption of, or on, a particular one of the virtualization systems, transitions at least one affected virtual machine to another virtualization system of the cluster and resumes computations of the transitioned virtual machine based on state encoded by a corresponding one of the virtual machine states represented in the storage.

28 Claims, 8 Drawing Sheets

(56) References Cited

U.S. PATENT DOCUMENTS

| | | | |
|---|---|---|---|
| 7,603,670 B1 * | 10/2009 | van Rietschote | 718/1 |
| 2003/0051021 A1 | 3/2003 | Hirschfeld et al. | |
| 2004/0010787 A1 | 1/2004 | Traut et al. | |
| 2005/0268298 A1 | 12/2005 | Hunt et al. | |
| 2006/0190766 A1 | 8/2006 | Adler et al. | |
| 2008/0155169 A1 | 6/2008 | Hiltgen et al. | |
| 2008/0155208 A1 | 6/2008 | Hiltgen et al. | |
| 2008/0155223 A1 | 6/2008 | Hiltgen et al. | |
| 2008/0189700 A1 | 8/2008 | Schmidt et al. | |

OTHER PUBLICATIONS

"VMware VMotion Live migration of virtual machines without service interruption"; VMware VMotion Product Datasheet; 1998-2006 VMware, Inc., 2 pgs.

"VMware VMotion Live migration of virtual machines without service interruption"; VMware VMotion Product Datasheet; 2006 VMware, Inc.; 2 pgs.

"VMware DRS Dynamic balancing and allocation of resources for virtual machines"; VMware DRS Product Datasheet; 1998-2006; 2 pgs.

"VMware HA Cost effective high availability for virtual machines"; VMware HA Product Datasheet; 1998-2006 VMware, Inc.; 2 pgs.

"VMware ESX Server Platform for virtualizing servers, storage and networking", VMware ESX Server Product datasheet; 2006 VMware, Inc.; 4 pgs.

"VMware VirtualCenter Centralized management, automation and optimization for IT infrastructure"; VMware VirtualCenter Product Datasheet; 2006 VMware, Inc.; 3 pgs.

"Basics of Failover Management in Application Clustering Packages"; Veritas Architect Network; Jul. 7, 2003; 2006 Symantec Corp., http://www.vertias.com/van/articles/3245.jsp; 11 pgs.

"Veritas Cluster Server by Symantec"; Data sheet: Server Management; 2006 Symantec Corporation; 5 pgs.

"Using Microsoft Virtual Server 2005 to Create and Configure a Two-Node Microsoft Windows Server"; 2003.

"NEC High-Availability Fault Tolerant-Virtual Server Solution" 2004 NEC Solutions (America), Inc.; 15 pgs.

"EMC AutoStart" data sheet; 2006 EMC Corporation; 4 pgs.

Rajagopal, S.; "PAC177 Distributed Availability Service (DAS) Architecture"; Presentation Oct. 2005; VMworld2005 Virtualize Now; Las Vegas, Oct. 18-20, 2005; 2005 VMware, Inc.; 41 pgs.

"Using VMware ESX Server System and VMware Virtual Infrastructure for Backup, Restoration, and Disaster Recovery"; white paper; 2005 VMware, Inc.; 18 pgs.

"Using Raw Device Mapping" white paper; 1998-2005 VMware, Inc.; 16 pgs.

Vaghani, S.; "PAC267-C ESX Server Storage Internals"; Presentation Oct. 19, 2005; VMworld2005 Virtualize Now, Las Vegas, Oct. 2005; 2005 VMware, Inc.; 28 pgs.

Khalil, M. et al.; "ESX Server Storage II Tips and Tricks Raw Disk Mapping"; Presentation, VMworld2005 Virtualize Now, Las Vegas, Oct. 2005; 2005 VMware, Inc.; 49 pgs.

Stockman, M. et al.; "Centrally-stored and delivered virtual machines in the networking system administration lab"; SIGITE NewsletterVol. 2, Issue 2 (Jun. 2005); ACM Press New York, NY USA; pp. 4-6.

VMware Best Practices "VMware Infrastructure Resource Management with VMware DRS"; 1998-2006 VMware, Inc.; 24 pgs.

* cited by examiner

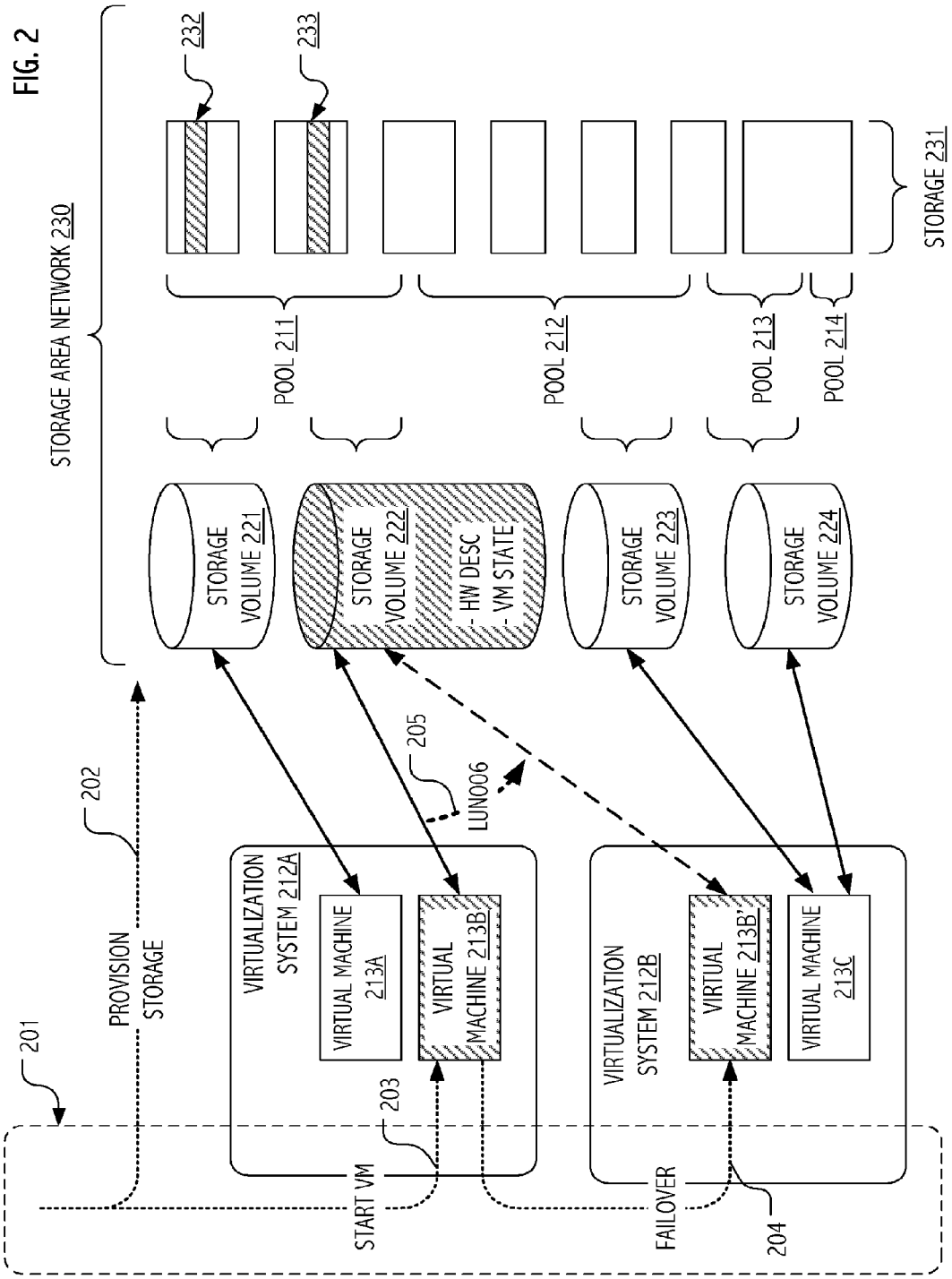

HIGH AVAILABILITY VIRTUAL MACHINE CLUSTER

CROSS-REFERENCE TO RELATED APPLICATION(S)

This application is a continuation of U.S. patent application No. 12/017,255, filed Jan. 21, 2008, now U.S. Pat. No. 8,554,981,which claims the benefit of U.S. Provisional Application No. 60/887,958, filed Feb. 2, 2007, which are both incorporated herein by reference.

This application is related to U.S. patent application No. 12/017,258, filed on Jan. 21, 2008, entitled "ADMISSION CONTROL FOR VIRTUAL MACHINE CLUSTER," which is incorporated herein by reference.

BACKGROUND

1. Field of the Invention

One or more embodiments of the present invention relate generally to computational systems and, more particularly, to techniques for providing and managing highly-available systems.

2. Description of the Related Art

A wide range of redundancy techniques have been employed in highly-available systems. In general, such techniques seek to replicate hardware, systems, components, subsystems or even software so that, in the event of a failure, relevant functionality may be maintained or at least quickly recovered. Redundancy may be provided at any of a variety of levels. For example, in information storage or transmission, it is common to manage redundant storage or transmission using error correcting codes (ECC), cyclic redundancy checks (CRC) and/or storage array technologies such as RAID ("Reliable Array of Inexpensive Disks) or as often deployed in storage attached network (SAN) architectures. Redundant subsystems such as power supplies or storage controllers are often employed to improve system availability.

In some fault-tolerant designs, fully redundant replicated hardware is employed at all of levels and duplicate (and ostensibly identical) computations are executed on the replicated hardware so that computations may continue uninterrupted at least in the event of any single failure. However, the increased complexity of such systems has often made them practical only for the most mission-critical applications.

Clustering techniques, though not always deployed strictly for purposes of availability improvement, have long been employed to allow two or more computers together in such a way that they behave like a single computer. In general, clustering can be used for parallel processing, load balancing or fault tolerance. Some tightly coupled clustering techniques (e.g., techniques employing shared boot disks and memory under control of an operating system that coordinates operations of the several nodes) date back at least to the days of VAX cluster systems popularized by Digital Equipment Corporation. More recently, loosely coupled architectures have gained popularity. Typically, clustering software is employed in such systems to distribute load or coordinate failover amongst largely independent computer systems. Systems such as the Veritas™ Cluster Server available from Symantec Corporation are typical. Operating system- or application-level cluster technology has been deployed in various releases of Microsoft™ Windows operating systems and Microsoft™ SQL Server software available from Microsoft Corporation.

In recent years, virtualization technology (e.g., as implemented in products such as those of VMware, Inc.) has presented new challenges for high-availability systems as more and more virtual servers are run concurrently on a single physical server. As a result, clustering techniques have been adapted to server virtualization. Veritas™ Cluster Server for VMware® ESX Server™ is one example of such adaptation and Microsoft has proposed simple 2-node clusters of Windows operating system instances using Microsoft Virtual Server 2005.

SUMMARY

Embodiments of the present invention include systems, methods and computer program products for providing and managing highly-available systems. In particular, one embodiment of the present invention is a system comprising: (a) plural virtualization systems configured in a cluster; (b) storage accessible to each virtualization system of the cluster, wherein for each virtual machine operative in a virtualization system of the cluster, the storage maintains a representation of virtual machine state that includes at least a description of a hardware system virtualized and an image of virtualized memory state for the virtual machine; and (c) a failover system that, responsive to an interruption of, or on, a particular one of the virtualization systems, transitions at least one affected virtual machine to another virtualization system of the cluster and resumes computations of the transitioned virtual machine based on state encoded by a corresponding one of the virtual machine states represented in the storage.

BRIEF DESCRIPTION OF THE DRAWINGS

FIG. 2 illustrates failover of a virtual machine from one virtualization system to another in accordance with some embodiments of the present invention using a storage area network (SAN) mediated representation of virtual machine state.

FIG. 3A illustrates a distribution of virtual machine computations prior to a failover triggering event, while FIG. 3B illustrates a distribution of virtual machine computations after such an event.

The use of the same reference symbols in different drawings indicates similar or identical items.

Description

Figure 1:
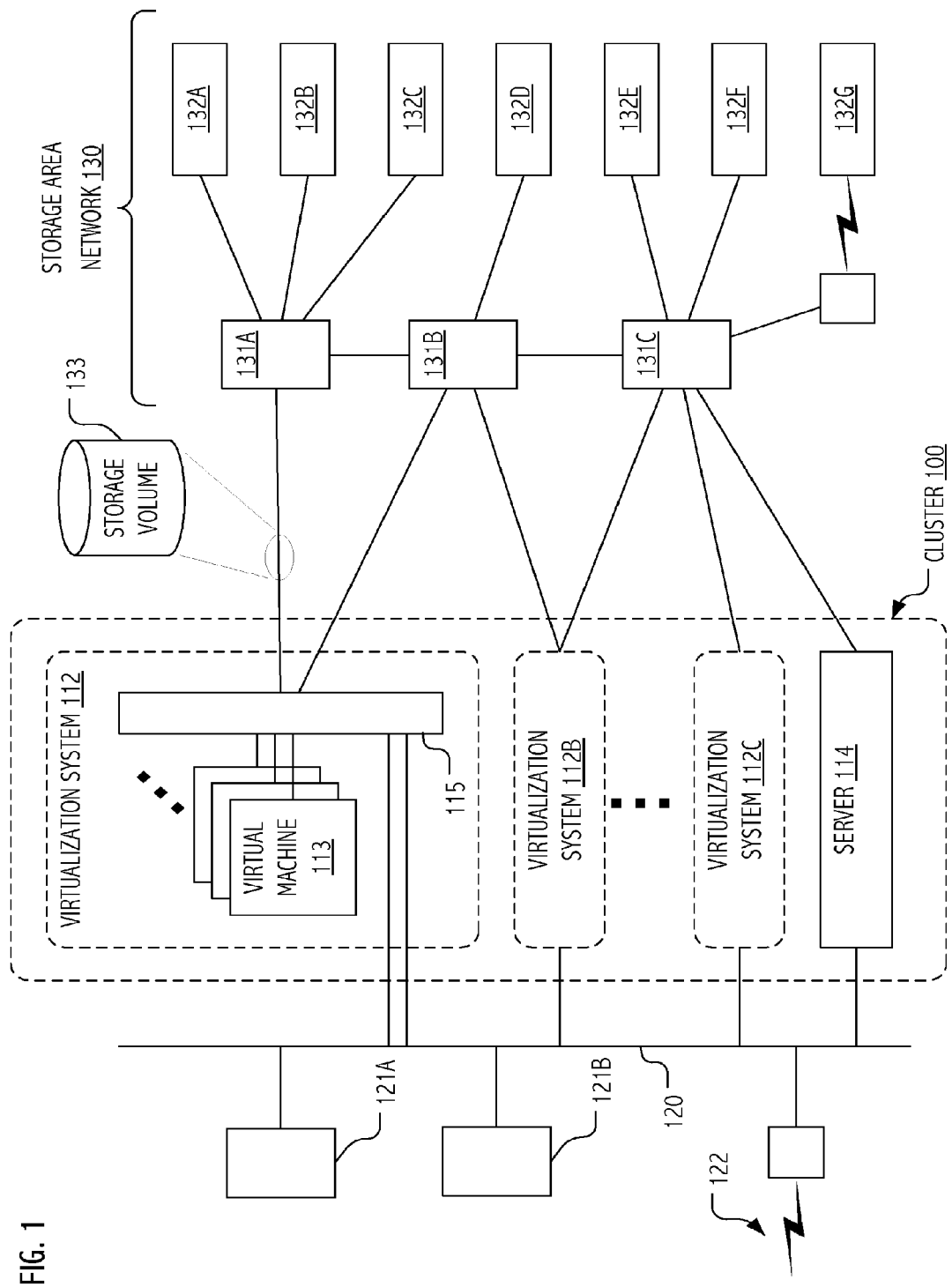
FIG. 1 depicts a cluster configuration of systems in which embodiments of the present invention may be employed.

Systems, methods and computer program products have been developed for efficiently failing over computations associated with at least one virtual machine from one virtualization system of a cluster to another using an encapsulated representation of virtual machine state that is maintained in shared storage and which includes a description of a hardware system virtualized and an image of virtualized memory state for the virtual machine. In some embodiments in accordance with the present invention, a failover mechanism including software transitions at least one virtual machine to another virtualization system of the cluster and resumes computations of the transitioned virtual machine based on state encoded by a corresponding one of the virtual machine states represented in the shared storage.

In accordance with one or more embodiments of the present invention, methods for configuring a cluster of virtualization systems provide a transparent computational platform for highly available virtual machines. Thus, a virtualization system failure (typically resulting from an underlying hardware or software failure) that would ordinarily interfere with, interrupt or terminate executing virtual machines can be tolerated and affected virtual machines can be transparently restarted on one or more other systems of the cluster. In particular, one or more embodiments of the present invention are methods for transparently "rehosting" individual executing virtual machines without requiring modifications to operating system code (or other guest software) executing in the virtual machine.

One or more embodiments of methods described herein can be effective in data center environments since failover can be configured per cluster of virtualization systems and, in accordance with some embodiments, virtualization system loads are managed consistent with failover-aware admission control policy. In some embodiments, failover targets are selected automatically for virtual machine instances based on static or dynamic load conditions and/or resource scheduling. Further, in accordance with one or more embodiments, no per-virtual-machine configuration is required, and new virtual machines added to the cluster automatically inherit failover properties. Still further, in accordance with one or more embodiments, customizations or changes to guest software (e.g., a guest operating system or purpose-built software "appliance") are not required; however, embodiments in accordance with the present invention may so-provide if desired.

In accordance with one or more embodiments of the present invention, an admission control mechanism is enforced so that there is sufficient spare capacity to restart a particular virtual machine in the presence of one or more failures. In accordance with one or more embodiments, failover is integrated with planned virtual machine operations, such as power-on/off and hot migration between hosts, managed by data center control systems. Advantageously, in accordance with one or more embodiments, a single point of failure is avoided, yet failover resources may be shared amongst several virtual machines, guest operating systems, purpose-built software appliance and applications. Further, in accordance with one or more embodiments, the methods described herein can integrate with distributed resource scheduling algorithm(s).

For concreteness, one or more embodiments are described based on facilities and terminology typical of certain processor architectures and systems, and based on terminology typical of certain operating systems, virtualization systems, storage systems and network protocols and/or services. That said, some embodiments of the present invention are general to a wide variety of processor and system architectures (including both single- and multi-processor architectures based on any of a variety of instruction set architectures), to numerous operating system implementations and to systems in which both conventional and virtualized hardware may be provided. Similarly, some embodiments of the present invention are general to a variety of storage architectures, including storage virtualization systems such as those based on Storage Area Network (SAN) technology. Although the focus (for simplicity of description) is on all-or-nothing virtualization system failures, one or more embodiments of the present invention techniques are not so limited. Indeed, based on the embodiments described, individual virtual machines may be failed over based on partial failures, e.g., isolated failure in a network card or connectivity, or based on software failures, interruptions or instabilities. In general, one or more embodiments of the present invention may be implemented in a host operating system, in a virtual machine layer, in cluster and/or data center control systems, using storage virtualization or combinations of the foregoing.

Accordingly, in view of the foregoing and without limitation on the range of underlying processor, hardware or system architectures, operating systems, storages architectures or virtualization techniques that may be employed, certain illustrative embodiments are described. Based on these embodiments, and on the claims that follow, persons of ordinary skill in the art will appreciate a broad range of suitable implementations and exploitations.

Computational Systems, Generally

FIG. 1 depicts a cluster of computational systems in which embodiments of the present invention may be employed to provide failover amongst systems of the cluster. In particular, FIG. 1 illustrates cluster 100 in which at least a collection of virtualization systems 112, 112B, 112C (but more generally, a mix of virtualization systems and conventional hardware systems such as server 114) are configured to operate as a coordinated computational platform. In the illustrated cluster configuration, constituent computational systems (e.g., virtualization systems 112, 112B, 112C and server 114) are coupled to network 120 which is illustrated (for simplicity) as a local area network with client systems 121A, 121B and communications interface 122, but will be more generally understood to represent any of a variety of networked information systems including configurations coupled to wide area networks and/or the Internet using any of a variety of communications media and protocols.

From the perspective of a client system such as client system 121A, cluster 100 may appear as one or more computer systems (presented, e.g., as application and/or file servers, database servers or services, other application services, network services, appliances, etc.) In general, neither the configuration of computational systems as a cluster, nor the use of virtualization technology in the provisioning of underlying hardware to computational roles, need be apparent to a client system.

In the illustrated configuration, Storage Area Network (SAN) technology is employed for at least some storage needs of computational systems participating in the cluster. In general, network storage systems (including SAN-based system 130) provide a level of virtualization for underlying physical storage elements (e.g., individual disks, tapes and/or other media), where the characteristics and/or configuration of particular storage elements may be hidden from the systems that employ the storage. SAN-based systems typically provide an abstraction of storage pools from which individual storage units or volumes may be allocated or provisioned for block level I/O access. In the illustrated configuration, a switched fabric topology consistent with Fibre Channel SAN technology is shown in which switches 131A, 131B, 131C and/or directors are employed to mediate high bandwidth access (typically using a SCSI (Small Computer System Interface) command set) to an extensible and potentially heterogeneous set of storage resources 132A, 132B, 132C, 132D, 132E, 132F, 132G, e.g., SATA (Serial ATA) and/or SCSI disks, tape drives, as well as arrays thereof (e.g., RAID (Redundant Array of Inexpensive Disks)). Such resources may be distributed and (if desirable) may provide data replication and/or off-site storage elements. Fibre Channel is a gigabit-speed network technology standardized in the T11 Technical Committee of the InterNational Committee for Information Technology Standards (INCITS).

In general, a variety of different types of interconnect entities, including directors, switches, hubs, routers, gateways, and bridges may be employed in topologies (or sub-topologies) that include point-to-point, arbitrated loop, switched fabric portions. Fibre Channel and non-Fibre Channel technologies including those based on iSCSI protocols (SCSI command set over TCP/IP) or ATA-over-ethernet (AoE) protocols may be employed in embodiments of the present invention. Similarly, any of a variety of media including copper pair, optical fiber, etc. may be employed in a network storage system such as SAN 130.

Although not specifically illustrated in FIG. 1, persons of ordinary skill in the art will recognize that physical storage is typically organized into storage pools, possibly in the form of RAID groups/sets. Storage pools are then subdivided into storage units (e.g. storage volumes, which are then exposed to computer systems (e.g., as a SCSI LUN on a SAN communicating via Fibre Channel, iSCSI, etc.). In some environments, storage pools may be nested in a hierarchy, where pools are divided into sub-pools. In general, persons of ordinary skill in the art will understand the SCSI-derived term LUN (Logical Unit Number) to represent an address for an individual storage unit, and by extension, an identifier for a virtual disk of other storage device presented by a network storage system such as SAN 130. By convention, we use the term LUN throughout this description; however, based on the description herein, persons of ordinary skill in the art will appreciate that we do so without limitation and any suitable identifier may be employed to identify an individual storage unit in embodiments of the present invention.

Embodiments of the present invention will be understood in the context of virtual machines 113 (or virtual computers) that are presented or emulated within a virtualization system such as virtualization system 112 executing on underlying hardware facilities 115. However, in addition, note that failover from (or to) a computational system embodied as a conventional hardware-oriented system may be supported in some clusters configured in accordance with the present invention. Nonetheless, for simplicity of description embodiments are described in which individual computational systems are embodied as virtualization systems that support one or more virtual machines. Virtualization systems are well known in the art and include commercial implementations, such as VMware® ESX Server™, VMware®Server and VMware® Workstation, available from VMware, Inc., Palo Alto, Calif.; operating systems with virtualization support, such as Microsoft® Virtual Server 2005; and open-source implementations such as available from XenSource, Inc.

Although certain virtualization strategies/designs are described herein, virtualization system 112 is representative of a wide variety of designs and implementations in which underlying hardware resources are presented to software (typically to operating system software and/or applications) as virtualized instances of computational systems that may or may not precisely correspond to the underlying physical hardware.

Figure 9:
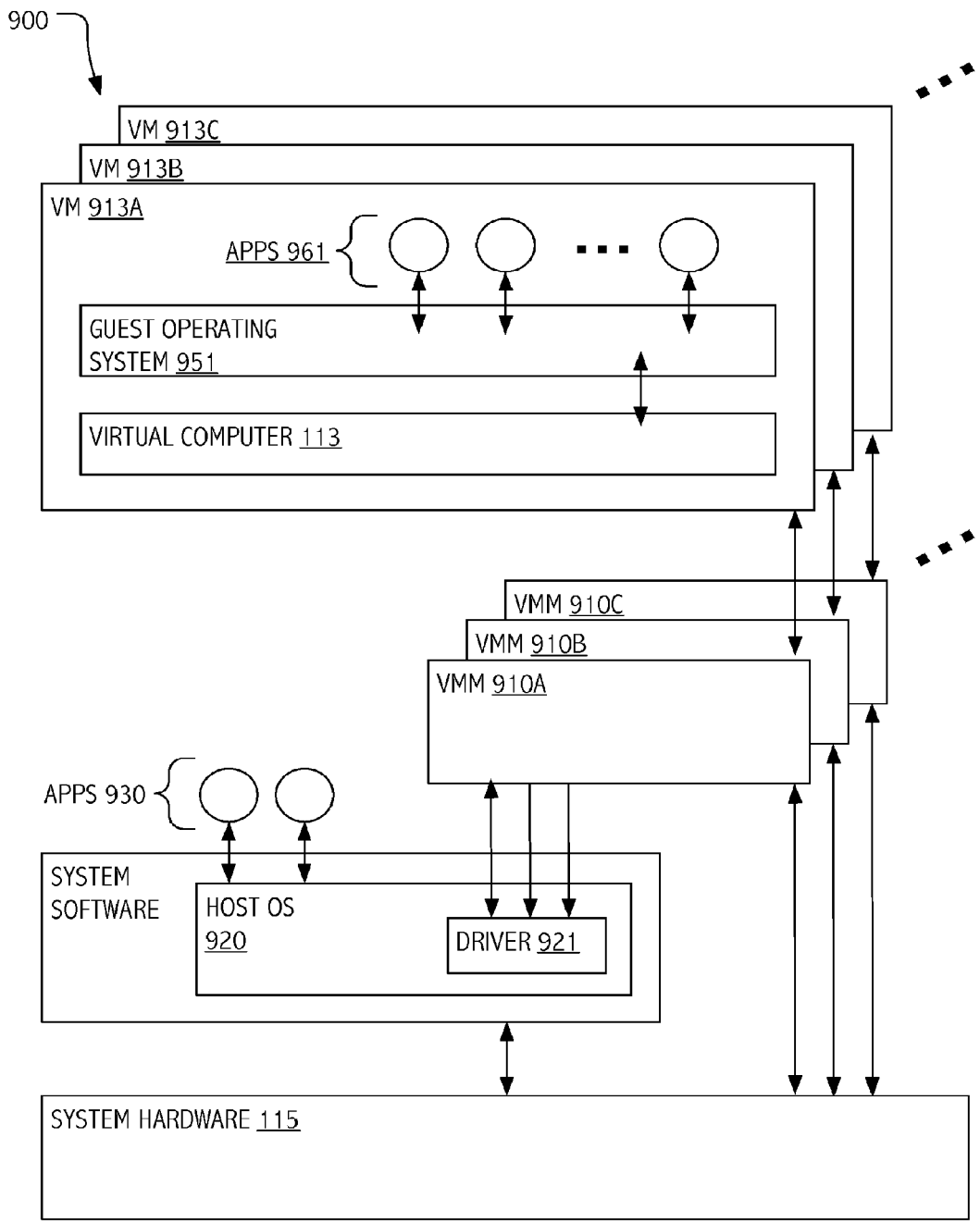
FIGS. 9 and 10 depict functional block diagrams of virtualization system configurations in accordance with respective embodiments of the present invention.
Figure 10:
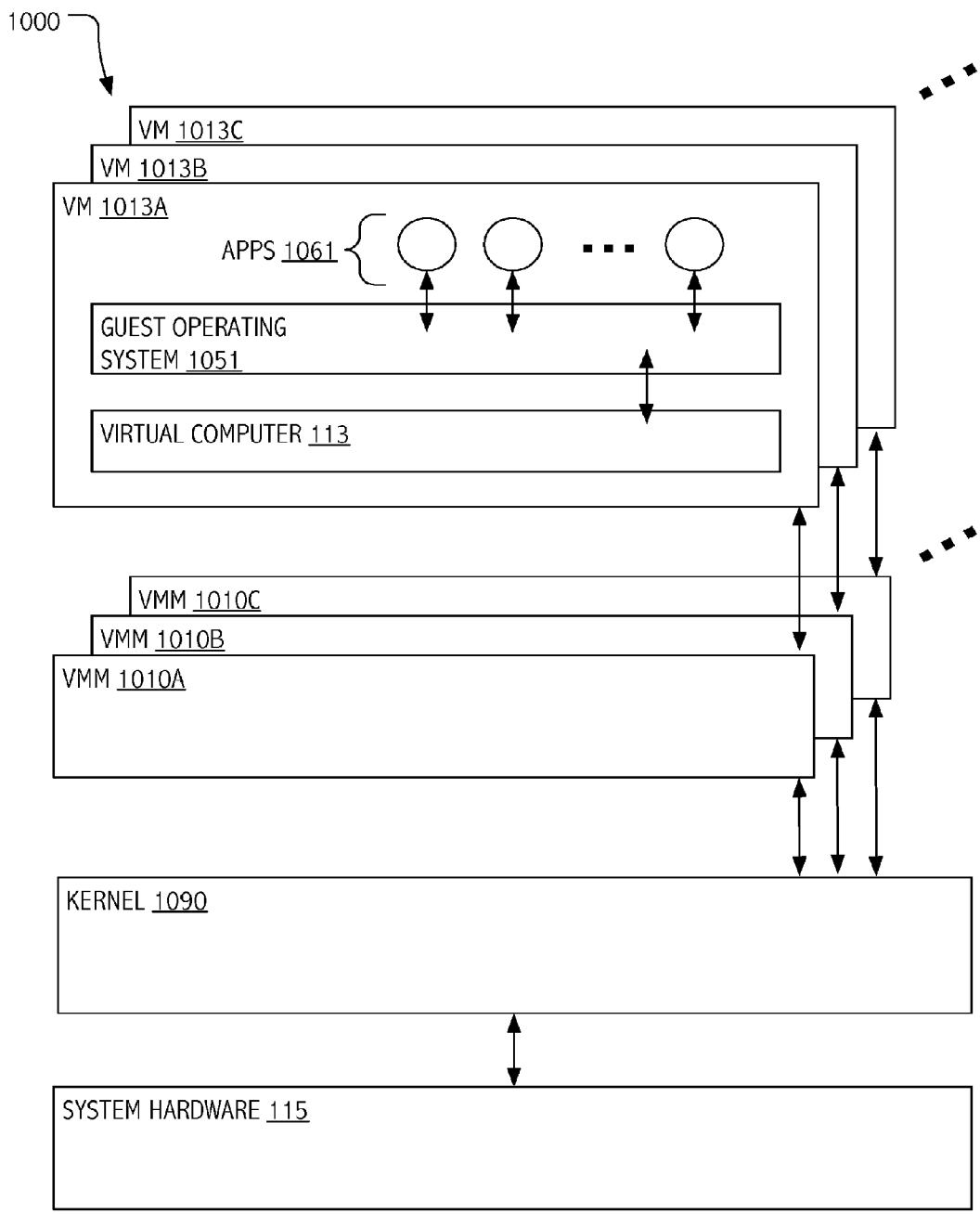

Examples of virtualization system technology and variations thereon (including hosted and non-hosted virtual computers, virtual machine monitors (VMMs), hypervisors and the like) are illustrated and described herein (without limitation) with reference to FIGS. 9 and 10. Based on the description herein, persons of ordinary skill in the art will understand failover techniques and operations in clusters of these and other virtualization systems. The following describes one or more embodiments of failover methods.

Virtual Machine Failover

FIG. 2 illustrates failover of a virtual machine from one virtualization system to another in accordance with some embodiments of the present invention using a storage area network (SAN) mediated representation of virtual machine state. In particular, FIG. 2 illustrates a system in accordance with some embodiments of the present invention in which failover of a virtual machine (213B, 213B') from one virtualization system (212A) to another (212B) is supported. In the illustrated system, storage volume 222 is provisioned (202) from underlying storage elements 231 for which access is mediated using storage area network (SAN) 230. Storage volume 222 includes both an encoding of virtual machine state and a description of the hardware system virtualized by virtual machine 213B. Other storage volumes (e.g., storage volumes 221, 223 and 224) encode information corresponding to other virtual machines.

Cluster management facility 201 includes failover support and is typically implemented using software distributed over several computational systems (including those associated with illustrated virtualization systems 212A and 212B of a simple 2-node cluster). Cluster management facility 201 manages and configures a cluster, assigning virtual machine instances to virtualization systems thereof. For example, in the illustration of FIG. 2, cluster management facility 201 assigns (see 203) virtual machine computations associated with VM instances 213A and 213B to virtualization system 212A and assigns virtual machine computations associated with VM instance 213C to virtualization system 212B. In support of VM instance 213B, storage volume 222 is provisioned (202) from storage pool 211 that spans several underlying storage elements of SAN 230. In the illustrated example, storage portions 232 and 233 from distinct storage elements are employed (e.g., using a redundancy technology such as RAID) to provide underlying storage that corresponds to LUN006 (storage volume 222).

Failover is facilitated by including both an encoding of virtual machine state and a description of the hardware system virtualized in a storage volume (or set of storage volumes) that corresponds to a particular virtual machine. In particular, the virtualized hardware description (e.g., an information encoding that specifies the model and configuration of CPU(s), disks, devices, etc. emulated by a particular virtual machine) allows the "right" virtual machine to be started on virtualization system 212B, while virtual machine state allows that virtual machine (now restarted as VM 213B') to continue along a computational path initiated (before failover 204) while VM 213B was hosted on virtualization system 212A. By maintaining a distinct storage volume (or a distinct set of storage volumes) for each virtual machine, individual virtual machines can be failed over independently and to different failover targets while preserving exclusive, block-level SAN-mediated access by the single virtualization system (and underlying hardware) that at any particular time hosts the corresponding virtual machine. In the illustrated example, ownership of LUN006 is transferred (205) from VM 213B (virtualization system 212A) to VM 213B' (virtualization system 212B) in correspondence with the failover.

Figure 3A:
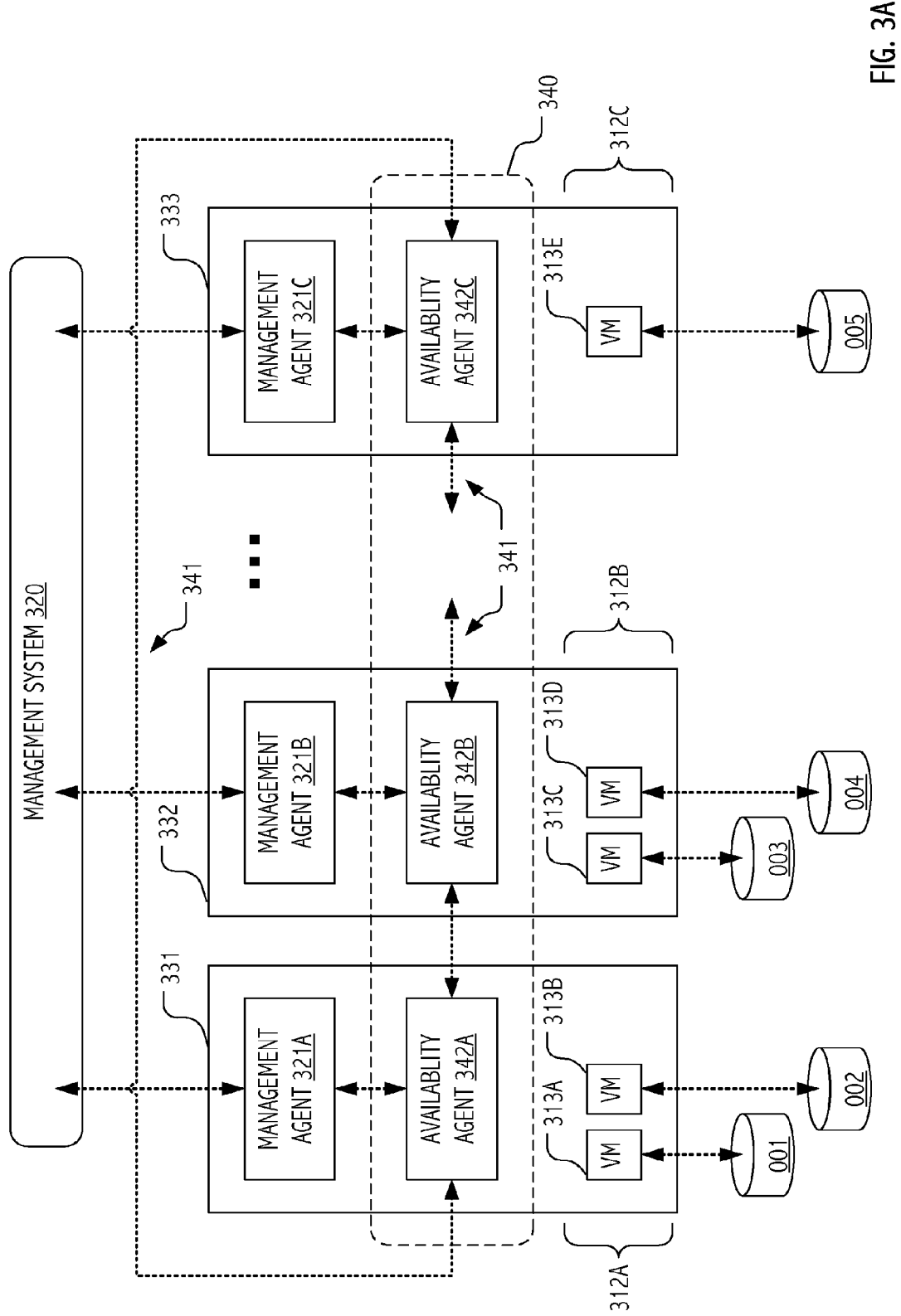
FIGS. 3A and 3B illustrate failover operation of a virtual machine cluster in accordance with some embodiments of the present invention.
Figure 3B:
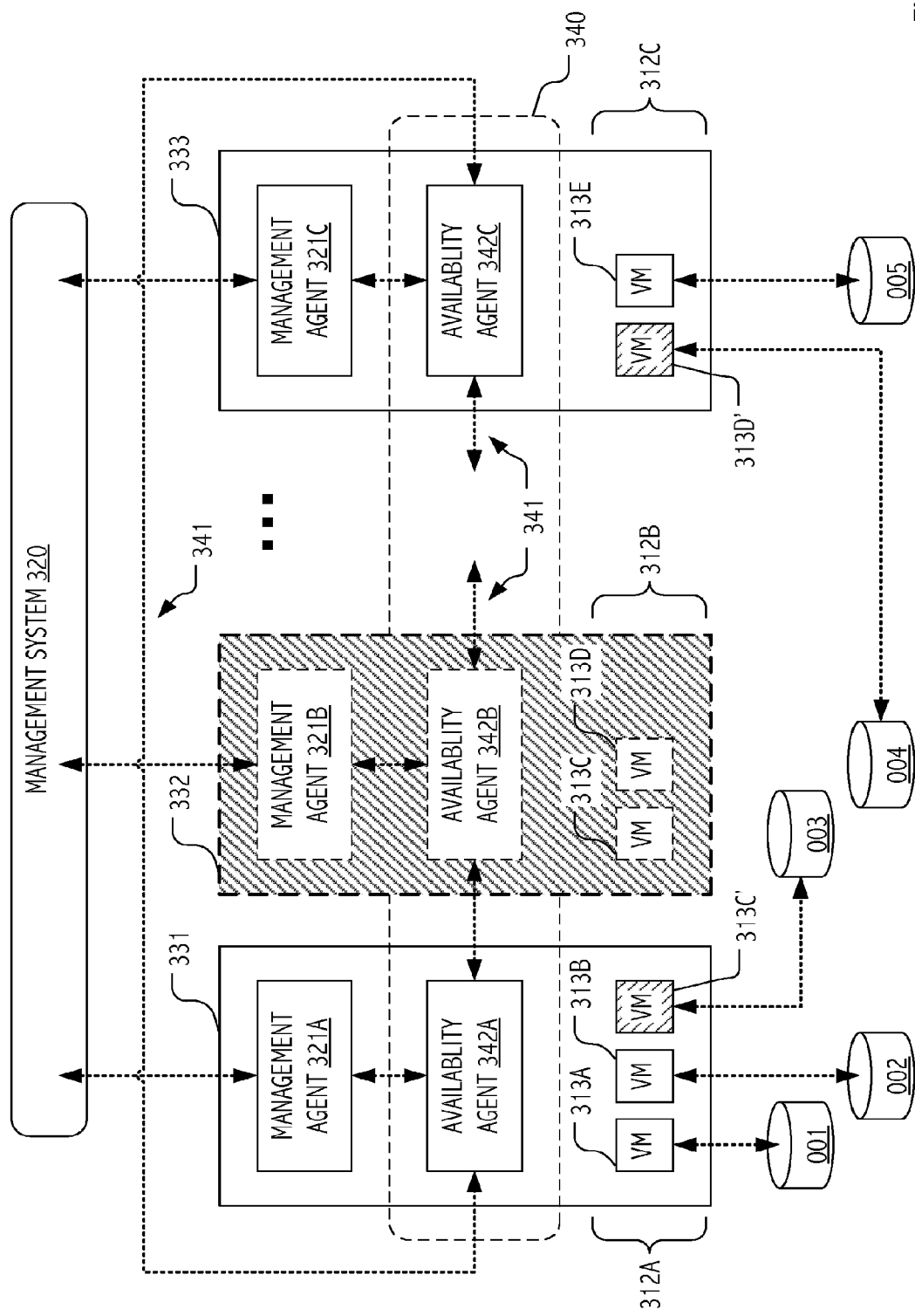

FIGS. 3A and 3B further illustrate failover operation of a virtual machine cluster in accordance with some embodiments of the present invention. In particular, FIG. 3A illustrates a distribution of virtual machine computations prior to a failover triggering event, while FIG. 3B illustrates a distribution of virtual machine computations after such an event. Virtualization systems 312A, 312B . . . 312C are illustrative of nodes of a multi-node cluster implemented using multiple instances of VMware® ESX Server virtualization software executing on corresponding hosts (331, 332 . . . 333) and managed as a resource pool using VMware® VirtualCenter management server software. A shared storage system (e.g., a SAN-based system such as previously described) presents suitable storage volumes (e.g., LUNs 001, 002, 003, 004 and 005). As before, individual storage volumes (or sets thereof) include both a backing representation of virtual machine state and a description of the hardware system virtualized by a respective virtual machine.

For each host (e.g., hosts 331, 332 . . . 333), a corresponding high-availability agent (HAA) is provided (see e.g., HAA 342A, 342B . . . 342C). Together, the HAAs are responsible for failure detection and for maintaining and/or communicating relevant status and/or configuration information sufficient to restart an affected VM on an alternate host. In general, the design of HAAs and related protocols and/or storage (collectively shown as high availability system 340) should provide such functionality without a single point of failure. In the illustrated configuration, a replicated distributed representation of status/configuration is presumed and a ring-topology, redundant path communication scheme is illustrated such that any single failure is tolerable and each surviving host possesses (or has access to) sufficient information to effectuate failovers described herein. Examples of such information are provided below.

In general, both an ability to detect a failure and an ability to access information necessary or helpful to effectuate a failover response should survive failures that a high-availability cluster is designed to tolerate. For clarity of description, embodiments are described that involve total failure of a singe host (e.g., host 332); however, based on the description herein persons of ordinary skill in the art will appreciate adaptations that would allow a high-availability cluster in accordance with the present invention to tolerate partial failures and/or multiple failures. Because existing commercially-available software systems (e.g., Veritas™ Cluster Server for VMware ESX and EMC® AutoStar™ failover automation software) exist that provide a packaged framework for meeting the basic failure detection and distributed or replicated information representation challenges described above, embodiments are described in a context consistent with such systems. Nonetheless, based on the description herein, persons of ordinary skill in the art will appreciate alternative configurations and solutions that may or may not leverage functionality of such packaged frameworks.

In view of the foregoing, and without limitation, assume high availability (HA) system 340 includes HA agents (HAAs 342A, 342B . . . 342C) with the following properties:

a. An HA agent runs on each host and can be used to communicate with and amongst other components of the HA system.
b. The HA system can detect if a host in the cluster has failed.
c. A failure-robust information representation is provided by the HA system, which can be populated with information descriptive of the set of virtual machines running on the hosts together with additional meta-information. This information is automatically available (whether by replication or fault-tolerant communications) on surviving hosts and can be used in case of host failures.
d. Whenever a host failure occurs, the HA system can use the descriptive information to cause a virtualization host to restart an affected virtual machine.

Specific methods for achieving the foregoing are now described.

Referring to FIG. 3A, an administrative user with access to management system 320 configures a failover cluster by grouping a set of virtualization hosts 331, 332 . . . 333 (e.g., creating a cluster), and enabling HA on the cluster. The configurations (including e.g., VM-to-host mappings for primary and alternate hosts, startup priorities, etc.) are propagated to the individual hosts. In the illustrated configuration, management agents 321A, 321B . . . 321C are employed as intermediaries in this communication and (like management system 320) need not be fully fault tolerant, but may (if desirable) integrate with other data center facilities, provisioning, automation, optimization and/or other facilities provided in a management system such as provided by VMware® VirtualCenter software. Of course, other mechanisms for propagating failover configuration information to an HA system may be employed in other embodiments.

In some embodiments, an administrator using management system 320 need not configure failover on a per-VM basis. Rather, virtual machines created or moved into the cluster may automatically inherit high-availability attributes. As more completely described below, the management system may compute and propagate to high availability (HA) system 340 at least a baseline set of failover information. For example, in some embodiments in accordance with the present invention, management system 320 employs admission control criteria and pre-computes a set of primary and alternate host assignments for each VM that may be admitted to the cluster consistent with the criteria. The assignments ensure that the cluster as a whole reserves sufficient excess capacity to tolerate a predetermined number of failures (typically a single failure) and establishes a priori to strategy for rehosting of affected VMs to alternate hosts in the event of such a failure.

In some embodiments, dynamic resource scheduling algorithms can be employed to refine or update primary and alternate host assignments based on actual or evolving load conditions. Similarly, in some realizations, VM-to-host mappings can be updated/recomputed when changes result from planned operations (e.g., scheduled power down of a VM) or VM migration (e.g., transparent migration of an executing VM from one virtualization system to another using VMotion® technology). In general, the resulting primary/alternate host assignments may be propagated to high availability (HA) system 340 (e.g., via HA agents 342A, 342B . . . 342C), updated in situ (using facilities of the HA system itself) or otherwise made consistent with current status of the cluster.

Of course, in some embodiments, it may be desirable to place individualized per-VM failover configurations under the control of an administrative user. For example, it may be desirable to allow an administrator to alter (or eliminate) certain HA capabilities for a given VM or to change configurations such as alternate host mappings, start-up priority, etc. Similarly, while embodiments are illustrated in the context of an overall virtualization environment in which sophisticated monitoring, management, provisioning, automation, optimization and/or other facilities of a management system (e.g., management system 320 and its agents 342A, 342B . . . 342C) are leveraged to improve or integrate failover, other allocations of functionality are possible. Indeed, in some embodiments, a management system (if provided) may not be involved in failover operations or provisioning. Generally, admission control, alternate host selection, resource scheduling and failover management capabilities can be provided as part of high availability (HA) system 340 or using other facilities or systems suitable for a given deployment.

In the illustration of FIG. 3A, management system 320 automatically configures the HA agent on each host with information about what virtual machines need to be failed over in the event of a host failure. Each virtual machine (VM) is uniquely identified in a host independent way, e.g., using the unique identifier or LUN for the storage volume in which the VM's backing state and its virtualized hardware configuration are stored. Although many information codings are possible, one suitable representation is as a table replicated (or reliably accessible) on each host (or on a sufficient subset of hosts) in which a current host, an alternate host and a corresponding LUN are identified for each VM. Using such information, each surviving HA agent is able to identify (i) the set of VMs affected by a host failure, (ii) which (if any) affected VMs are to be restarted in the associated local virtualization system, and (iii) for each VM to be restarted on the local virtualization system, the storage volume (or volumes) in which both a definition of the VM and its state data may be found. In the illustrated configuration, LUN 003 stores a backing representation of virtual machine state for VM 313C and a description of the hardware system virtualized by VM 313C. Similarly, LUN 004 stores a backing representation of virtual machine state for VM 313D and a description of the hardware system virtualized thereby.

FIG. 3B illustrates the results of failover after high availability (HA) system 340 has detected a failure of host 332. In the illustrated configuration, HA system 340 is responsible for detecting the failure of a host or relevant components, devices, services applications or subsystems thereof and, as described above, restarting the affected virtual machines on respective alternate hosts. In the illustration of FIG. 3B, VMs 313C and 313D are affected by a failure of (or on) host 332.

In general, failure detection methods that are employed in any given embodiment of the present invention are implementation dependent (or at least dependent on the high availability system framework employed). However, a variety of methods may be commonly employed in embodiments of the present invention and based on these techniques, persons of ordinary skill in the art will appreciate suitable adaptations for other embodiments. For example, in a given host and virtual machine configuration, a particular virtual machine will exhibit dependencies on at least some components/facilities of the host, e.g., use of particular network adapters, host-bus adapters, or other hardware. In some configurations, dependencies on software components or dependencies on services or connectivity may also exist. As a practical matter, some components may be (or may be considered to be) essential to the operation of the host and therefore all VMs executing in coordination with an associated virtualization system. In general, HA agents may report to each other regarding operational status or, in some situations, may remotely probe or interrogate their peers. Similarly, guest software (e.g., an operating system or other important software system) can provide heartbeat information that signals whether the guest software is functioning properly. Heartbeats can be as simple as ensuring the guest OS remains responsive, or may include application- or service-level monitoring (e.g., is a web-server responsive? . . . or is a Quality of Service [QOS] commitment being met?).

In some embodiments, even soft failures, degraded operation, or failures within a given VM may be detected and handled by HA system 340. In some embodiments, all detected failures on a host are presumed to affect all VMs executing thereon. In other embodiments, HA system 340 may evaluate the impact of a particular failure on a VM-by-VM basis and respond accordingly. In any case, certain failures trigger a failover response for affected virtual machines when detected by HA system 340. Accordingly, for clarity of description and examples, it is presumed (without limitation) that detectable failures all trigger a failover response.

In general, once a host failure or VM failure is detected, HA system 340 determines which VMs are affected and which alternative host of the cluster should be used to restart each affected VM. In the illustrated configuration, virtual machines (e.g., VMs 313A, 313B, 313C, 313D and 313E) were initially allocated to virtualization systems of the cluster. In general, any of a variety of resource allocation constraints may be employed including load balance, VM co-location, capacity or performance requirements, network connectivity or specialized hardware/device support provided by an underlying host system. As a general matter, any (or all) of these factors may be useful in selecting failover targets. For clarity of the present description (though without limitation), focus in the illustrative embodiments is on a short list of factors; however, based on the description herein, persons of ordinary skill in the art will appreciate modifications and/or extensions.

In general, a selection of failover targets may be performed at any time (including after failure detection) and by any suitable decision system. Nonetheless, for simplicity of description, the following presumes (without limitation on the full range of embodiments) that at least tentative selections will be made in advance. In such embodiments, runtime response of HA system 340 can devolve to a simple retrieval of the predetermined failover response and restart of VMs in accordance with the predetermined response. In such a system, predetermination (and update) of a failover response can be performed using facilities that are not themselves fault tolerant as long as failure detection and failover response mechanisms are robust to failures. In this way, some of the complexities of coordinated distributed decision making in the presence of failures can be avoided. Of course, in some embodiments, admission control, load-balance and/or distributed resource scheduling may be implemented using fault-tolerant system methods and employed in the determination of an appropriate failover response. In any case, these and other variations will be understood based on the description which follows.

Figure 4:
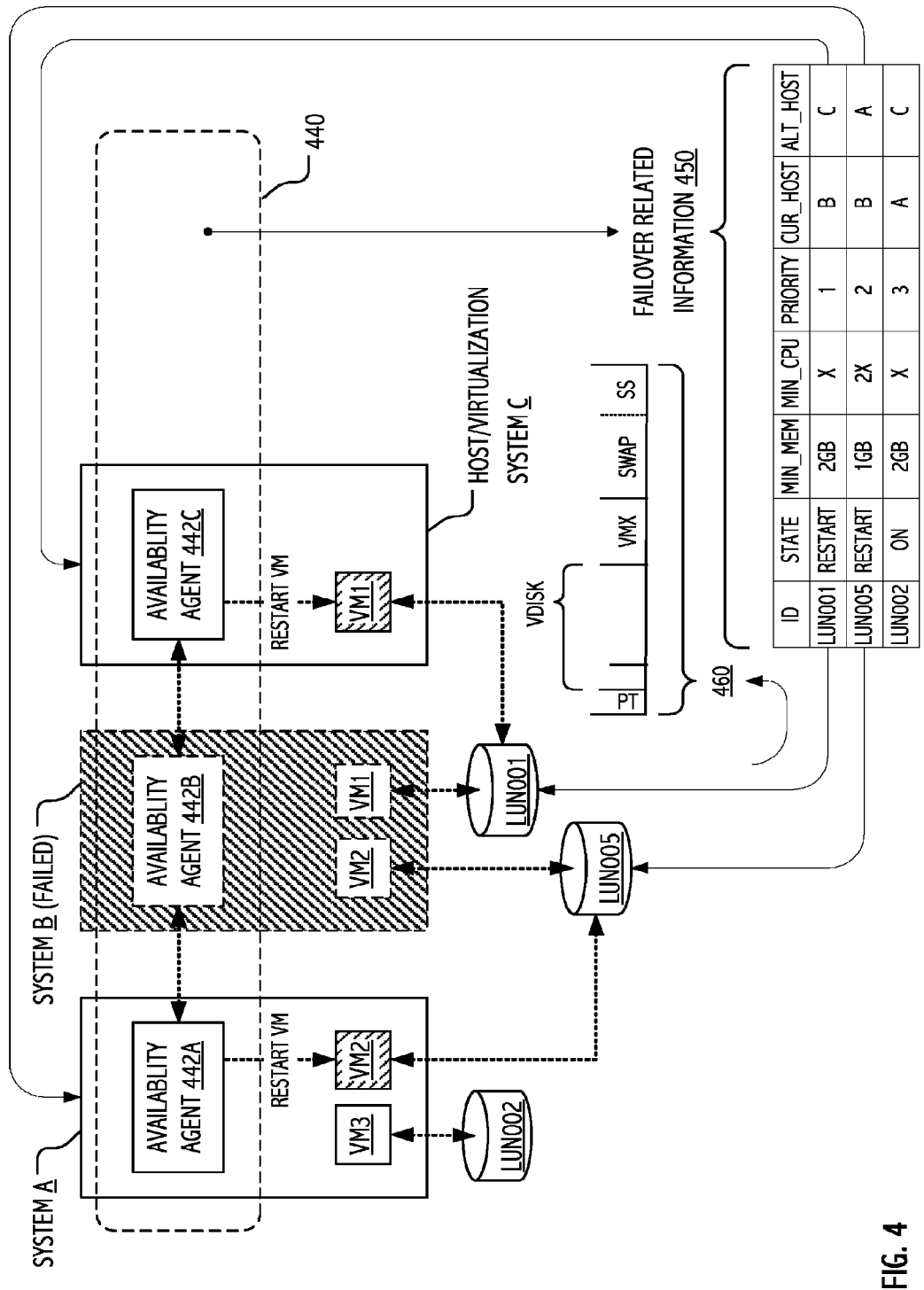
FIG. 4 illustrates use of a distributed representation of failover data and of an encapsulated representation of virtualization system state data and configuration data in accordance with some embodiments of the present invention.

FIG. 4 illustrates use of a distributed representation of failover data and of an encapsulated representation of virtualization system state data and configuration data in accordance with some embodiments of the present invention. As shown in FIG. 4, failover responses and related information 450 are illustratively coded as a table replicated (or reliably accessible) on each host or on a sufficient subset of hosts in a failover cluster. In the illustrated coding, each VM executing on a virtualization system of the 3-node cluster (i.e., each of virtual machines VM1, VM2 and VM3) is associated with (or identified by) a corresponding LUN. Both a current and an alternate host (or virtualization system) are identified for each VM. In addition, restart priorities PRIORITY are specified together with minimum memory and CPU requirements (MIN_MEM and MIN_CPU) for VM startup or operation. A state indication STATE is also provided. In some embodiments, a state indication may be used to identify that a particular VM is in a transition state (e.g., during migration from one virtualization system to another using VMotion® technology). Similarly, a management layer may use update state indication (e.g., to RESTART) as a part of a mechanism that initiates failover based on an arbitrary event.

Host/virtualization system A initially hosts virtual machine VM3 for which LUN002 encodes both backing state data and a definition of the hardware configuration virtualized. Host/virtualization system B initially hosts two virtual machines VM1 and VM2. Corresponding storage volumes LUN001 and LUN005 encode backing state data and respective definitions of the hardware configurations virtualized. Host/virtualization system B eventually fails and virtual machines VM1 and VM2 are failed over in accordance with failover information 450 and under control of HA system 440.

In the illustration of FIG. 4, an HA agent on each surviving host (i.e., HA agents 442A and 442C) is able to identify the set of virtual machines affected by a failure of (or on) host/virtualization system B, namely virtual machines VM1 and VM2 for which the current host value CUR_HOST corresponds to host/virtualization system B. Using failover information 450, HA agent 442A identifies that its corresponding host (host/virtualization system A) is the restart target (ALT_HOST) for virtual machine VM2 which is uniquely identified (and defined) by contents of storage volume LUN005. Similarly and independently, HA agent 442C identifies that its corresponding host (host/virtualization system C) is the restart target (ALT_HOST) for virtual machine VM1 which is uniquely identified (and defined) by contents of storage volume LUN001.

Note that the set of virtualization systems that make up a cluster (e.g., the 3-node cluster illustrated in FIG. 4) need not be static. Indeed, more generally, virtualization systems may be added and/or removed from a cluster (e.g., under control of management system 320, see FIG. 3). When virtualization systems are added or removed from the system, failover targets (e.g., those coded as failover responses and related information 450) may be recalculated. Indeed, in some embodiments, an admission control system may adjust accordingly and automatically power up (or power down) virtual machines in accordance with an altered resource base. Admission control techniques are described in greater detail below.

In some embodiments, after additional resources are added to a cluster, failover support (e.g., that provided by HA system 440) may retry failover of virtual machines that could not previously be accommodated. Generally, VM priorities (e.g., those coded as failover responses and related information 450) are used to ensure that limited resources are first allocated to failover of higher priority VMs. For example, if a fully loaded cluster that enforces admission controls has been configured to tolerate a single-host failure and 2 hosts have failed, then some lower priority virtual machines will not be restarted. However, if an additional virtualization system is added to the cluster, there may be additional capacity. Accordingly, in some embodiments, HA system 440 may automatically restart VMs that could not previously be restarted.

As previously described, a storage volume associated with a given virtual machine provides both a definition of the system virtualized and backing state data that codes a current (or at least recent) consistent state of the virtual machine. For example, storage volume LUN001, which in some embodiments of the present invention is managed by using storage area network (SAN) technology presented to the cluster as a LUN, codes at least description (VMX) of the hardware system virtualized by virtual machine VM1 and backing representation (SWAP) of virtual machine state for virtual machine VM1. Similarly, LUN005 provides a backing representation of virtual machine state and a description of the hardware system virtualized by virtual machine VM2.

The backing representation of state for respective virtual machines is separated into separate storage volumes (e.g., LUN001, LUN002 . . . LUN005). By avoiding commingling of backing representations of state data (e.g., SWAP constituents in respective storage volumes) for multiple virtual machines, exclusive high-bandwidth, block-level access to backing state data (e.g., using SAN technologies such as previously described) without coordination protocols and overheads typical of file systems or other shared concurrent access storage models is facilitated. In addition, segregation of virtual machine state data can provide certain isolation and security advantages in some embodiments. Accordingly, while underlying storage elements may be collectively managed as a SAN, the backing representations of VM state data (e.g., SWAP, see FIG. 4) for distinct VMs may be stored in distinct storage volumes (e.g., LUN001, LUN002 . . . LUN005) allocated from one or more storage pools of the SAN.

In general, storage of additional data for a given virtual machine (e.g., hardware description VMX, virtual disk(s) VDISK, snapshot data SS, etc.) may be encapsulated into a single storage volume with the corresponding backing state data SWAP as illustrated in FIG. 4. However, more generally, at least some of this additional data (e.g., data descriptive of a particular virtualized system data and data associated with at least some virtual disks) may be separately represented. For example, virtual disks and/or hardware description data may be represented in one or more LUNs separate from that (or those) employed for storage of backing state data. Similarly, some of the additional data employed in multiple virtual machines may be commingled, if desired. For example, storage for virtual disks employed by multiple virtual machine instances (particularly secondary virtual disks that include static sharable images of operating system extensions and/or application software) may be commingled in shared storage. Similarly, some embodiments may employ a library of possible virtual hardware configurations that are stored in shared storage. In such embodiments, failover information 450 (or other information accessible to a restart target) should code the additional storage associations.

Nonetheless, for convenience, simplicity or isolation of data sufficient to restart a virtual machine, at least backing state data (SWAP) and a description of the system virtualized (VMX) in a VM-specific LUN may be encapsulated. In this way, both the information necessary to instantiate a new and properly configured VM and to define its state are represented in a way that allows virtualization software convenient access, but does not require that HA system 440 (or its agents) have particular knowledge of the storage architecture employed. Inclusion of at least a primary virtual disk (e.g., VDISK, see FIG. 4) may also be desirable, particularly when guest software maintains at least some disk-resident state. Finally, snapshot information (whether managed directly by a virtualization system or indirectly using facilities provided in many modern SAN systems) can provide failover systems described herein with rollback and other desirable capabilities. In any case, identification (in failover related information 450) of a single VM-specific LUN (e.g., LUN001 for VM1) allows HA agent 442C to initiate restart of an affected VM without substantial complexity or access control challenges. Accordingly (though without limitation), certain shared storage configurations that encapsulate additional data (such as a primary virtual disk VDISK, system description VMX, and explicit or implicit snapshot data SS) together with backing state data SWAP are illustrated.

In general, virtualization system state data and configuration data can include multiple constituent elements: backing state data, virtual primary disk data, virtual hardware configuration data (e.g., type of processor virtualized, type of virtual network card, type of virtual storage host bus adapter (HBA), amount of memory virtualized, etc.), snapshot data, and zero or more virtual secondary disks (sometimes referred to as virtual secondary disk data). Based on the description herein, persons of ordinary skill in the art will appreciate that in various embodiments, these constituents may be aggregated together in encapsulated forms, distributed amongst multiple storage volumes or units, further divided, etc. Typically, a particular storage organization and coding will be selected based on performance, management convenience, security/isolation goals or other virtualization system dependent criteria. Nonetheless, to provide a useful descriptive context (and without limitation), certain illustrative storage organizations and elements thereof are described.

In general, backing state data of a virtual machine includes a coding of execution state for a virtual machine at a particular time whether or not suspended. For example, backing state data often includes an image (or other coding) of current data in all or a portion of a memory utilized by a virtual machine (e.g., instruction and/or value data in the virtual machine's RAM, cache, registers, etc.). A boot disk (e.g., a boot sector and OS disk image) may reside on the primary virtual disk or elsewhere. In some realizations (e.g., those in which a "network boot" is provided), an underlying encoding of the boot disk may not be closely associated or encapsulated with other elements of virtual machine state. Virtual hardware configuration data codes a configuration of a virtual machine. For example, virtual hardware configuration data typically codes a type and configuration of processor(s), network card(s), storage host bus adapter (HBA), memory, chipset, virtual primary disk, etc. virtualized (or emulated) by a given virtual machine.

FIG. 4 illustrates an embodiment of the present invention using encapsulated representation 460 of virtual machine state and configuration data. In the illustrated representation, a partition table PT indexes or otherwise inventories partitions of the encapsulated representation. For example, in encapsulated representation 460, partitions are provided for a primary virtual disk VDISK, for a description VMX of the hardware system virtualized and for backing state data SWAP of VM1.

Typically, snapshot data SS will be maintained using facilities of a storage system (not separately shown) that transparently support snapshot, checkpointing, state cloning, rollback and/or other related operations without necessarily exposing underlying storage of data for incremental/successive states. For example, snapshot facilities available in modern commercial SANs are typically space efficient (employing copy-on-write and/or delta state technology) and typically provide transparent checkpointing and rollback support for a succession or hierarchy states related to a baseline. Accordingly, snapshot data SS is illustrated as an adjunct to backing state data SWAP although other representations may be employed, if desired.

For purposes of illustration, a 2-level hierarchy of partitions is shown in which primary virtual disk VDISK resides in a partition of encapsulated representation 460, but includes its own partition table and associated storage partition. Although the illustration suggests a single data partition corresponding to primary virtual disk VDISK, persons of ordinary skill in the art will recognize that the partitioning configuration is arbitrary. In general, use of an embedded partition allows some virtualization system implementations to expose primary virtual disk VDISK to a virtual machine (e.g., to VM1 running first on system B then on system C) while restricting access to data in the encapsulating partition (particularly backing state data SWAP and any snapshot data SS).

Figure 5:
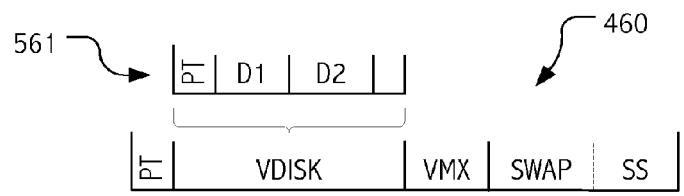
FIGS. 5, 6, 7 and 8 depict a variety of alternative representations of virtualization system state data and configuration data in accordance with some embodiments of the present invention.
Figure 6:
Figure 7:
Figure 8:
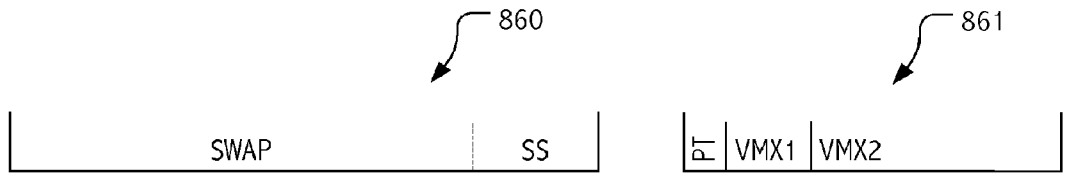

FIG. 5 illustrates encapsulated representation 460 in somewhat greater detail. By limiting guest (OS/application) access to data residing in partitions (e.g., partitions D1 and D2) of lesser included partition 561, a risk that sensitive information contained in state data, virtual hardware configuration data, or snapshot data can potentially leak to a guest of the virtual machine is reduced. Actions by a guest, whether accidental or intentional, could result in the inappropriate use, deletion or corruption of such data. Therefore, restricting guest access to non-disk data can enhance security and reliability and may be desirable in some embodiments. Nonetheless, other data representations may be employed in other embodiments. FIGS. 6-8 illustrate alternative representations of virtualization system state data and configuration data in accordance with some embodiments of the present invention.

FIG. 6 illustrates an encapsulated representation 660, in which partitions are provided for a description VMX of the hardware system virtualized and for backing state data SWAP together with snapshot data sets SS supported in the embodiment. In the failover scenario of FIG. 4, encapsulated representation 660 would be the primary storage volume (or LUN) corresponding to virtual machine VM1, while additional storage (e.g., for virtual disks VDISK1 and VDISK2) resides in other storage such as a secondary storage volume (or LUN) 661 or other shared storage. In general, failover related information 450 may be extended to identify a secondary storage volume. Alternatively, an identifier (e.g., the corresponding LUN) for secondary storage volume 661 may be coded in data of primary storage volume 660 for use by virtualization system C in exposing the appropriate virtual disk partitions to VM1 once restarted.

FIG. 7 illustrates an encapsulated representation 760, in which partitions are provided for a pair of virtual disks VDISK1 and VDISK2 in addition to a description VMX of the hardware system virtualized, backing state data SWAP and snapshot data sets SS. In the illustration of FIG. 7, a single-level partitioning structure is employed.

Finally, FIG. 8 illustrates a representation 860 in which a primary storage volume is employed for storage of backing state data SWAP together with any snapshot data sets SS. Separate storage is provided for additional virtual machine data such as a description of the hardware system virtualized or any virtual disks provided. In the failover scenario of FIG. 4, representation 860 would be the primary storage volume (or LUN) corresponding to virtual machine VM1, while additional storage (e.g., a secondary storage volume 861) containing description VMX1 could be employed for a description of the hardware system virtualized by virtual machine VM1. As before, failover related information 450 may be extended to identify the secondary storage volume or other identification methods may be employed.

Admission Control

Highly-available systems such as described herein seek to ensure that there is enough excess capacity in the system to tolerate populations of failures that can be expected in actual system operations. Because typical failures (or at least the repair/remediation thereof) tend to affect hardware systems on a host-level of granularity, reliability design goals for the virtualization system clusters described herein are typically specified in terms of the number of host failures tolerated. For example, a typical availability policy requires that the system tolerate total loss of any single host (and its virtualization system) without loss of availability of virtual machines supported by the cluster. Note that some availability policies may require that the system tolerate multiple host failures or failures of related hosts, services or facilities. More generally, failures and reliability design goals can be modeled at finer levels of granularity and may account for partial failures; however, for clarity of description and examples, embodiments are illustrated in a context of an availability policy that requires that a cluster tolerate failure of any single host.

In some embodiments of a high-availability cluster in accordance with the present invention, an availability policy is specified as the number of host failures that can be tolerated, and this policy is enforced using admission controls that limit the population of VMs that may be started in the cluster. Consistent with an implemented admission control policy, the cluster will elect not to "power up" a virtual machine if a design level of availability cannot be guaranteed in a worst-case scenario. Accordingly, a VM power up operation can fail even though there is apparently enough excess capacity in the cluster to support its startup and/or operation.

One strategy for admission control is to ensure (for each resource type) that $RESOURCES_{REQUIRED} <= RESOURCES_{PROVIDED}$, where:

$$RESOURCES_{PROVIDED} = \sum_{Hosts} capacity(Ideal) - \sum_{Hosts} lostCapacity(WorstCase)$$

and $$RESOURCES_{REQUIRED} = \sum_{Powered\ VMs} requirements$$

where capacity lost in a WorstCase scenario corresponds to the design limit of the reliable system design. For example, in an example in which an availability policy requires that a cluster tolerate a specified number N of host failures, Worst-Case lost capacity is the capacity of the N hosts having the greatest capacity. In general, a balance between resources provided and those required should be evaluated for each type of resource requirement, e.g., memory, CPU, network connectivity or bandwidth, etc., that serves to characterize host capacity and virtual machine requirements.

However, the approach described above may not be robust in situations where granularity of host capacities and virtual machine requirements vary or are not well matched. For example, a total of 10 GBytes of unallocated physical memory equally distributed amongst five (5) hosts/virtualization systems of a cluster (2 GBytes per host) is not helpful if a worst case failure would require that a single virtual machine requiring 4 GBytes of physical memory be rehosted. Accordingly, in some embodiments of the present invention, a conservative implementation of the general resource model for admission control is used. The limited computational requirements of the conservative implementation make it amenable to on-the-fly admission decisions and these computational requirements scale well with increasing numbers of virtual machines, hosts and types of resources considered.

First, iterate over a population of virtual machines and calculate, for each resource type, a minimum resource level that would be sufficient to meet the needs of each virtual machine. For example, in one embodiment, determine the maximum of all minimum physical memory requirements for virtual machines of the population. Thus, if one virtual machine required 2 GBytes of physical memory and each of the others of a given population individually required less than 500 MBytes, one would estimate 2 GBytes as the minimum per-VM resource requirement for all virtual machines of the population. Do the same for other resource types such as CPU capacity, network connectivity or bandwidth, etc. and adopt the resulting multi-dimensional characterization of minimum resource requirements as a conservative model of resource requirements for all virtual machines of the population. In general, this can be thought as creating a minimum capacity "bounding box" for all powered-up VMs and all resource types. This is referred to as a boxCapacity.

For simplicity of description, assume there are two (2) resource types of interest, memory and CPU, and embodiments are illustrated using a 2-dimensional characterization of resource requirements and boxCapacity. Of course, based on the description herein, extensions for larger numbers of resource types are straightforward and will be appreciated by persons of ordinary skill in the art.

For each host (or virtualization system), calculate how many virtual machines with the capacity requirement of box-Capacity can fit on the host. This number of VM slots is referred to as a slotCount for a host (or virtualization system). Finally, determine the number of VM slots that would be lost in the case of a worst-case failure. For example, in a cluster where toleration of N host failures is the reliable design limit, subtract the total number of VM slots provided by the N hosts having the highest slotCounts from the total number of VM slots provided by the cluster. Thus, in a cluster designed to tolerate one (1) host failure, subtract the slotCount for the highest capacity host from the sum of slotCounts for all hosts in the cluster. The result, maxSlot, is the maximum number of VM slots one has for virtual machines if one is to ensure that the cluster will tolerate N host failures. An invariant during virtual machine provisioning, and as virtual machines hosts/virtualization systems are added and removed from the cluster (e.g., by management system 320, see FIG. 3), is that no more than maxSlot virtual machines are admitted to the cluster.

Referring illustratively, to FIG. 4, failover related information 450 may include (or maintain) per-VM resource requirements for each resource type to facilitate recalculation and update of modeled boxCapacity, slotCounts and maxSlot cluster admission constraints in correspondence with dynamic changes in the population of virtual machines and available hosts/virtualization systems. Note that because the failover methods described herein allow a set of virtual machines hosted by a failed virtualization system (e.g., VM1 and VM2 initially hosted on system B) to be independently migrated to different restart targets (e.g., to host/virtualization systems A and C), excess capacity need only be provided at a VM-level rather than at a host-level. As a result, load balance and planned operations can be managed in a straight-forward way largely independent of admission control.

Persons of ordinary skill in the art will recognize that the above-described implementation is a simplified solution to more general (and NP complete) packing problems. It is straightforward and fast to compute (or recompute) in the presence of dynamic variations in virtual machine and host populations. It is suitable at least for relatively uniform or coherent host capacities and relatively uniform or coherent granularity in resource requirements for a given population of virtual machines. Of course, more advanced variations can be employed, if needed. For example, a gradation of boxCapacity measures (e.g., large and small) may be employed to model a distribution of virtual machine resource footprints. Similarly, more complex capacity models and/or optimization techniques may be employed. In any case, the conservative admission control techniques described herein ensure that there is sufficient excess capacity in the cluster to restart all admitted VMs given the number of host failures that must be tolerated based on an availability policy or metric.

Planned Operation Integration

In general, the failover methods described herein can be implemented in ways that are transparent to ordinary virtual machine operations, such as power-up/down operations. For example, in the context of FIGS. 3A and 3B, virtual machine provisioning, power-up, power-down and even migration using facilities such as VMotion® technology can be controlled from management system 320. As previously described, management system 320 and its host-resident agents 342A, 342B . . . 342C can supply HA system 340 with VM-to-host assignments, failover targets, etc. Accordingly, in some embodiments in accordance with the present invention, management system 320 coordinates its update of primary/alternate host assignments supplied to HA system 340 with a directive that a VM be "powered-down." Alternatively, HA system 340 may update failover information itself based on a power down directive from management system 320.

In any case, as part of a power operation, management system 320 directs HA Agents 342A, 342B . . . 342C that a particular virtual machine (e.g., VM 313A) is no longer active and should be removed from the set of virtual machines for which an automatic failover is provided. This directive is typically propagated to HA system 340 before VM 313A is powered down or at least coincident with power down. Similarly, when a virtual machine is "powered-up," it is registered with HA system 340 before the power up operation completes or at least coincident therewith.

In this way, HA system 340 maintains failover related information (see 450, FIG. 4) consistent with managed VM operations and will not misdiagnose scheduled or purposeful removal of a virtual machine from the cluster. As a result, inappropriate failover restart can be avoided for virtual machines that are removed and newly added virtual machines are automatically included in the failover scheme.

Virtual Machine Migration

As previously described, VM-to-host mappings can be updated/recomputed when changes result from planned operations (e.g., scheduled power-down of a virtual machine) or VM migration (e.g., transparent migration of an executing virtual machine from one virtualization system to another using VMotion® technology). For example, in the illustrative context of FIGS. 3A and 3B, primary/alternate host assignments may be propagated to high availability (HA) system 340 (e.g., via HA agents 342A, 342B . . . 342C), updated in situ (using facilities of the HA system itself) or otherwise made consistent with current status of the cluster.

From the perspective of an HA agent, migration of a virtual machine looks like a power-up of the VM on the destination host followed by a corresponding power-down of the VM on the source host. However, since completion of an end-to-end migration can take 10s of seconds during which the destination host demand pages VM state and continues VM computations, simply removing the executing virtual machine from failover coverage provided by high availability (HA) system 340 during migration is not desirable. On the other hand, failing over a virtual machine (based on a failure of the source host) while concurrently bringing up the virtual machine on the destination host could result in two instances of the same virtual machine. Therefore, in a virtual machine cluster that supports VMotion® technology, high availability (HA) system 340 should track a migrating VM as in a transition state.

If the source host fails, completion of the VM migration will typically suffice for failover as long as source VM state is available in storage such as provided by the SAN-resident storage volumes described elsewhere herein. On the other hand, failure of the destination host may require a failover operation initiated by HA system 340. Accordingly, in a cluster of virtualization systems that support VMotion-style migration, both the source and destination code are responsible for notifying the HA system 340 (typically via their local HA agent) upon successful completion of the VMotion operation. In case of a single host failure, the surviving host will update an HA Agent. When that is done, the HA Agent verifies that the VM is still running. If not, the VM is restarted using failover restart sequences already described herein. If the source host failed, a reasonable choice for the restart target is the VMotion destination.

Distributed Resource Scheduling

If desirable, failover functionality described herein can be integrated with a distributed resource scheduling service (DRS) to provide HA system 340 with restart target selections based on actual runtime loads. Note that, in this context, runtime load includes the resource loads (e.g., CPU, memory, connectivity/bandwidth, etc.) actually imposed by executing virtual machines, which is typically different than static power up capacity requirements employed in admission controls.

Ideally, a DRS algorithm would be invoked at or about the time of failure, computing optimal alternate hosts for each VM. Unfortunately, this is often not practical or desirable, since it presumes a fault-tolerant DRS system. Typically, DRS algorithms require a cluster-wide view of the system and historical statistics for each host. Although DRS algorithms and related data sets can be made fault-tolerant, the complexity and related overheads of such solutions may be undesirable. Accordingly, in some embodiments in accordance with the present invention, the approach taken supports DRS algorithms on a system, e.g., management system 320 (see FIGS. 3A and 3B), that may not be highly-available or fault-tolerant.

Instead, the DRS algorithm is invoked periodically on management system 320 to calculate the alternate hosts for all VMs assuming a failure of the current hosts. Thus, an alternate host is computed for each VM. As previously described, alternate host information is propagated to HA system 340 via host-resident agents 342A, 342B . . . 342C.

Virtualization System Technology and Variations

As is well known to those of ordinary skill in the art, a virtual machine (VM) is a software abstraction—a "virtualization"—of an actual physical computer system. FIGS. 1-4 illustrate aspects of clusters of virtualization systems in accordance with some embodiments of the present invention. In an effort to emphasize features relevant to the inventive concepts, certain aspects of more complete virtualization system implementations have been abstracted.

In general, some interface is provided between the guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Unless otherwise indicated, embodiments of the present invention may be used (and/or implemented) in (or in conjunction with) virtualized computer systems having any type or configuration of virtualization software.

In view of the above, and without limitation, an interface usually exists between a VM and the underlying platform which is responsible for actually executing VM-issued instructions and transferring data to and from the memory and storage devices or underlying hardware. Subject to the foregoing, certain commercially available virtualization systems employ a "virtual machine monitor" (VMM) in this role. A VMM is usually implemented as a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices can be presented as part of previously described VMs (see FIGS. 1-4), in some virtualization system implementations, these "components" are at least partially implemented as constructs or emulations exposed to a VM by the VMM. One advantage of such an arrangement is that the VMM may be set up to expose "generic" devices, which facilitate VM migration and hardware platform-independence. In general, such functionality may be said to exist in the VM or the VMM.

It should be noted that while VMMs can be viewed as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. Such configurations, sometimes described as "hosted" and "non-hosted" configurations, are illustrated in FIGS. 9 and 10. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Our techniques for providing high-availability clusters of virtualization systems may build on systems of either configuration although "non-hosted" configurations have typically been preferred in the data center environments described herein. Accordingly, in view of the variations, two exemplary virtualization system configurations are summarized and, based on the preceding description, persons of ordinary skill in the art will appreciate suitable hosted and non-hosted implementations of the inventive concepts.

Hosted Virtual Computers

FIG. 9 illustrates virtualization system configuration 900 commonly referred to as a "hosted" virtualized computer system in which a virtual machine monitor (e.g., VMM 910, VMM 910A, VMM 910B) is co-resident at system level with host operating system 920 such that both the VMMs and the host operating system can independently modify the state of the host processor. VMMs call into the host operating system via driver 921 and a dedicated one of the user-level applications 930 to have the host OS perform certain I/O operations on behalf of the VM. The virtual computer in this configuration is thus hosted in that it runs in coordination with an existing host operating system. Virtualization systems that include suitable facilities are available in the marketplace. Indeed, VMware® Server virtual infrastructure software available from VMware, Inc., Palo Alto, Calif. implements a hosted virtualization system configuration consistent with the illustration of FIG. 9. VMware® Workstation desktop virtualization software, also available from VMware, Inc. also implements a hosted virtualization system configuration consistent with the illustration of FIG. 9.

Non-Hosted Virtual Computers

FIG. 10 illustrates a virtualization system configuration commonly referred to as a "non-hosted" virtualized computer system in which dedicated kernel 1090 takes the place of and performs the conventional functions of a host operating system. Virtual computers (e.g., VM/VMM pairs) run on the kernel. Compared with a system in which VMMs run directly on the hardware platform, use of a kernel offers improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. Indeed, ESX Server™ virtual infrastructure software available from VMware, Inc., Palo Alto, Calif. implements a non-hosted virtualization system configuration consistent with the illustration of FIG. 10. ESX Server is a trademark of VMware, Inc.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization.

Other Embodiments

While the invention(s) is (are) described with reference to various implementations and exploitations, it will be understood that these embodiments are illustrative and that the scope of the invention(s) is not limited to them. In general, virtual machines may be implemented consistent with hardware system now existing or hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Although achieving a goal of VMM transparency may be facilitated using techniques of the present invention, VMM transparency is not required. Rather, the virtualization system support for power management interfaces and mechanism may be incorporated in so-called "para-virtualization" systems in which a guest operating system is aware that it is being virtualized, and has an explicit interface to the VMM. In such systems, functionality analogous to that described herein as a VMM is sometimes referred to as a "hypervisor."

Many variations, modifications, additions, and improvements are possible. For example, while particular failover techniques and facilities have been described in detail herein, applications to other failover designs or responses will also be appreciated by persons of ordinary skill in the art. Furthermore, while techniques and mechanisms have been described using particular network configurations, hardware architectures, memory organizations and particular operating system constructs (typically IA-32 based architectures/systems and Windows operations systems) as a descriptive framework, persons of ordinary skill in the art will recognize that it is straightforward to modify such implementations for use in systems that support other processor instruction set architectures, other network or memory configurations and/or other operating system constructs.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A system comprising:
   plural virtualization systems configured in a cluster;
   storage accessible to each virtualization system of the cluster, wherein for each virtual machine operative in a virtualization system of the cluster, the storage maintains a representation of virtual machine state;
   encapsulations, in respective volumes of the storage, of virtual machine state for respective ones of the virtual machines, wherein each of the encapsulations encodes at least one or more virtual disks for a particular virtual machine of the cluster, wherein each of the respective encapsulations is configured to limit guest access to data residing in the one or more virtual disks; and
   a failover system that transitions at least one virtual machine affected by an interruption to another virtualization system of the cluster.

2. The system of claim 1, wherein the representation of virtual machine state includes at least a description of a hardware system virtualized and an image of virtualized memory state for the virtual machine, and wherein the transitioning by the failover system includes:
   starting a new instance of the affected virtual machine using the virtualized hardware system description; and
   at least partially defining state of the new instance using the image of virtualized memory state.

3. The system of claim 1, wherein the representation of virtual machine state includes at least a description of a hardware system virtualized and an image of virtualized memory state for the virtual machine, and wherein the image of virtualized memory state for a particular virtual machine is encoded in a volume of the storage that is distinct from, and not commingled with, storage used to encode an image of virtualized memory state for any other virtual machine.

4. The system of claim 1, wherein each of the encapsulations encodes at least a description of a hardware system virtualized and backing state data of its corresponding virtual machine.

5. The system of claim 4,
   wherein the respective encapsulations are distinct from, and are not commingled with, each other, and wherein each of the respective volumes is configured for exclusive block level access in connection with operation of its corresponding virtual machine.

6. The system of claim 4,
   wherein the respective encapsulations further encode state of one or more virtualized storage resources employed by the corresponding virtual machine.

7. The system of claim 4,
   wherein the respective encapsulations further encode one or more snapshots of virtual machine state in addition to a current state.

8. The system of claim 1, wherein the failover system includes:
   an availability agent associated with each virtualization system of the cluster, wherein respective availability agents maintain identifiers for respective representations of virtual machine state for at least those ones of the virtual machines which the associated virtualization system may be called upon to continue computations.

9. The system of claim 8,
   wherein the availability agents together maintain a coherent replicated representation of identifiers for the representations of virtual machine state.

10. The system of claim 8,
   wherein the availability agents each maintain, for at least those virtual machines executing on another virtualization system of the cluster, identifiers for the respective representations of virtual machine state in the storage.

11. The system of claim 8,
wherein, for each virtual machine executing on one of the virtualization systems of the cluster, one of the availability agents pre-identifies its corresponding virtualization system as the primary failover host.

12. The system of claim 8, further comprising:
a provisioning mechanism that tracks, for each virtual machine, a set of resource requirements, the provisioning mechanism admitting virtual machine computations to the cluster based on an admission control policy that, consonant with the resource requirements of virtual machines provisioned to any particular set of virtualization systems, assures sufficient excess capacity on other virtualization systems of the cluster to support, in the event of interruption of the particular set, transition of all virtual machines operative thereon to the other virtualization systems of the cluster.

13. The system of claim 12,
wherein the resource requirements include both computational and memory requirements.

14. The system of claim 12,
wherein the admission control policy conservatively estimates, for each resource requirement, a worst case capacity sufficient to support the most resource intense virtual machine operative in the cluster, and based on the estimated worst case capacity requirements admits new virtual machine computations only if sufficient excess capacity exists on the virtualization systems of the cluster to support, in the event of interruption of the particular set of virtualization systems, all virtual machines operative thereon.

15. The system of claim 12, wherein the particular set is selected based on one or more of:
number of interruptions or failures to be tolerated; and
specialized resources and/or connectivity of any particular virtualization system of the cluster.

16. The system of claim 12,
wherein the particular set includes at least the most heavily provisioned virtualization system.

17. The system of claim 12,
wherein the particular set is sufficient to span multiple virtualization system failures.

18. The system of claim 1, further comprising:
a distributed resource scheduling mechanism that assigns virtual machines to virtualization systems based on actual runtime load conditions and precomputes, for each virtual machine, a preferred alternative virtualization system based on the actual runtime load conditions.

19. The system of claim 1,
wherein the storage includes a storage area network (SAN); and
wherein the storage unit is provisioned and maintained as a storage unit of the SAN.

20. The system of claim 1,
wherein the storage is configured as network attached storage (NAS) or is interfaced using a small computer systems interface over TCP/IP (iSCSI) protocol.

21. The system of claim 1,
wherein the virtualization systems each execute on an underlying hardware platform; and
wherein the interruption includes one or more of:
a failure of the underlying hardware platform or connectivity of the underlying hardware platform with a network, device or resource;
a failure of the particular virtualization system, and
a failure of the virtual machine to be transitioned.

22. The system of claim 1,
wherein the interruption includes scheduled or unscheduled power down of the virtual machine to be transitioned, of or of an underlying hardware platform.

23. A method of operating a cluster of virtualization systems, the method comprising:
maintaining, for each virtual machine executing on a virtualization system of the cluster, an encapsulated representation of virtual machine state in storage accessible to each virtualization system of the cluster; and
transitioning at least one of the virtual machines to another virtualization system of the cluster,
wherein each encapsulated representation is maintained in the respective different volume of the storage so as to include the virtual machine state for the respective one of the virtual machines and so as to include encoding of one or more virtual disks for a particular virtual machine of the cluster, and
wherein each encapsulated representation is configured to limit guest access to data residing in the one or more virtual disks.

24. The method of claim 23,
wherein the transitioning is in response to an interruption of, or on, a particular one of the virtualization systems.

25. The method of claim 23,
wherein the encapsulated representations are distinct from, and are not commingled with, each other, and
further comprising configuring respective ones of the encapsulated representations for exclusive block level access in connection with operation of a corresponding one of the virtual machines.

26. A non-transitory computer readable storage medium embodying computer software implementing a method of operating a cluster of virtualization systems, the method comprising:
maintaining, for each virtual machine executing on a virtualization system of the cluster, an encapsulated representation of virtual machine state in storage accessible to each virtualization system of the cluster; and
transitioning at least one of the virtual machines to another virtualization system of the cluster,
wherein each encapsulated representation is maintained in the respective different volume of the storage so as to include the virtual machine state for the respective one of the virtual machines and so as to include encoding of one or more virtual disks for a particular virtual machine of the cluster, and
wherein each encapsulated representation is configured to limit guest access to data residing in the one or more virtual disks.

27. The computer readable storage medium of claim 26,
wherein the transitioning is in response to an interruption of, or on, a particular one of the virtualization systems.

28. The computer readable storage medium of claim 26,
wherein the encapsulated representations are distinct from, and are not commingled with, each other, and
wherein the method further comprises configuring respective ones of the encapsulated representations for exclusive block level access in connection with operation of a corresponding one of the virtual machines.

* * * * *